(12) United States Patent
Chow et al.

(10) Patent No.: US 6,782,540 B1
(45) Date of Patent: Aug. 24, 2004

(54) COBOL/NATURAL COPYBOOK TO JAVA CONVERSION WIZARD

(75) Inventors: Ivan Chow, Plano, TX (US); Wing Lee, Irving, TX (US); Jiangxiang Yang, Plano, TX (US); Denis Tsai, Dallas, TX (US)

(73) Assignee: Sprint Communications Company, L.P., Overland, KS (US)

( * ) Notice: Subject to any disclaimer, the term of this patent is extended or adjusted under 35 U.S.C. 154(b) by 712 days.

(21) Appl. No.: 09/629,924

(22) Filed: Jul. 31, 2000

(51) Int. Cl.[7] .............................................. G06F 9/54
(52) U.S. Cl. ........................ 719/316; 709/203; 717/118; 707/203
(58) Field of Search .................................. 719/310–320, 719/328–330; 709/200–207, 217–219, 230–237; 717/118, 136–139, 148; 707/100, 101, 102, 103 R, 103 Y, 103, 103 Z (56) References Cited

U.S. PATENT DOCUMENTS

| | | | |
|---|---|---|---|
| 5,940,075 A | * | 8/1999 | Mutschler et al. .......... 345/760 |
| 6,094,684 A | * | 7/2000 | Pallmann .................... 709/227 |
| 6,209,124 B1 | * | 3/2001 | Vermeire et al. ............ 717/114 |
| 6,601,234 B1 | * | 7/2003 | Bowman-Amuah ......... 717/108 |
| 6,615,199 B1 | * | 9/2003 | Bowman-Amuah .......... 706/50 |

\* cited by examiner

*Primary Examiner*—St. John Courtenay, III (57) ABSTRACT

The present invention, sometimes referred to as an Application Message Wrapper Generation Wizard or Wizard (for short), is a tool to help application developers map Cobol or Natural copybooks into a message command for an ASCII-based text messaging service. In this sense, the Wizard facilitates communication between client applications and server applications by allowing the client to use generic requests and allowing the Wizard generated files providing the correct protocol and syntax for communication with the destination server application. The Wizard generates Java classes that will mine/plant data a runtime between business objects and a message string that corresponds to the copybook's data structure, and vice versa. The Wizard recognizes different data types of copybook fields respectively, and converts them to/from ASCII. The Java classes generated by the Wizard also serve to abstract mainframe services so as to encapsulate ASCI text messaging system calls from the business layer by treating mainframe services as an ordinary operation on an object and so as to act as a layer than can serve to pave a path for migrating services away from a legacy environment. The generated Java code ensures efficient runtime performance for mining/plating of data. The present invention relates to the Wizard itself, the method of using it, the software system using the files generated by the Wizard and the method of using the generated software system.

20 Claims, 3 Drawing Sheets

COBOL/NATURAL COPYBOOK TO JAVA CONVERSION WIZARD

FIELD OF THE INVENTION

This invention relates to the field of information retrieval and bi-directional messaging and more particularly to the integration of heterogenous computer systems into an enterprise wide message driven client-server system which simplifies network connections and facilitates business process re-engineering.

BACKGROUND OF THE INVENTION

CORBA is a distributed object system that is defined under the Common Object Request Broker Architecture (CORBA) specification produced by OMG. Distributed object systems may be in the context of an Object Request Broker (ORB) implemented under the CORBA specification from the OMG. Revision 2.0, Revision 2.1, Revision 2.2 and Revision 2.3, all of which are incorporated herein by reference in their entirety. For purposes of this disclosure, program compliant with CORBA Revision 2.3, 2.2, and 2.1 by definition will be viewed as compliant with CORBA Revision 2.0. Unless otherwise specified, a generic reference to CORBA will be presumed to be OMG's CORBA Services Revision 2.0 and a generic reference to CORBA-complaint or to a CORBA platform or program or system will be viewed as compliant with CORBA Services Revision 2.0.

Mercury is a CORBA based communication system that facilitates bi-directional messaging between any CORBA platform and a server platform in a peer-to-peer manner. Client applications (Java, C++ and Smalltalk applications that run on NT and Sun) can communicate with server applications (DB2, COBOL, Natural) through Mercury's messaging mechanism. Mercury is a specific embodiment of an ASCII-based text messaging system for facilitating communication between CORBA and non-CORBA platforms. While the following discussion primarily focuses on Mercury specifically, the same principles could equally be applied to any ASCII-based text messaging system serving similar functions.

COBOL applications deal with data using a data structure referred to as a copybook. A copybook is a text file that defines a data structure used by the server application. Each copybook consists of a field name, a data type, and field length. Natural applications deal with data using "pdl" or "pda" files which, for purposes of this invention, shall likewise be referred to as copybooks. While not identical in structure to Cobol copybooks, these Natural storage units may be similarly handled for conversion purposes. While the foregoing discussion will primarily be addressed in terms of COBOL copybooks, it is likewise applicable to pda or pdl files for Natural applications. For the purposes of this disclosure the use of the term copybook, in the absence of specifying COBOL copybook, shall be defined to include pda or pdl files for Natural applications. Similarly they may be generally or collectively referred to as data structures.

Client applications that wish to communicate with server applications through Mercury must obtain the copybook of the desired server application.

Mercury has a parameter called applicationMessage that is used for passing data between client and server applications. The applicationMesaage is an ASCII string that contains data in a sequence of ASCII characters. The applicationMessage data reflects the copybook's data structure.

Following is a simple copybook for a COBOL application:

01 LNP-DATA-RECORD1.

| 05 | LNP-TELEPHONE-NUM | PIC X(10). |
|----|-------------------|------------|
| 05 | LNP-PORTABILITY   | PIC X(01). |
| 05 | LNP-OWNING-LEC-CD | PIC X(05). |
| 05 | LNP-SERVING-LEC-CD| PIC X(05). |

The server application uses the offset from the beginning of the copybook to determine the value of each field.

Here is the applicationMessage layout for the above copybook.

```
0              9 10    14        18 (char)
  FIELD 1    | 2 |  3   | 4          |
```

FIELD1: LNP-TELEPHONE-NUM

FIELD2: LNP-PORTABILITY

FIELD3: LNP-OWNING-LEC-CD

FIELD4: LNP-SERVING-LEC-CD

Client applications can define message sending to Mercury by mapping each field of the copybook to an array of characters. This represents direct mapping of the copybooks which is carried out by each of the individual client applications. There are some major disadvantages by doing direct mapping:

1. Copybooks usually contain multiple fields, sometime up to hundreds and usually has some complicated inner structure (e.g. nested structures (referred to in COBOL as occurs), arrays, and the like). Server applications treat the data strictly by their offsets. If any field's offset is miscalculated, then every field could potentially be invalid.
2. Copybook fields have various data types (i.e. character, integer, float etc.), that need to be converted into different data types in ASCII.
3. Client applications area expected to be simple, flexible, and easily updated if a copybook is changed.

SUMMARY OF THE INVENTION

The present invention includes a method for generating computer files based on user input which facilitate communication between a client application and a copybook text file. The method includes reading in a copybook text file selected by the user, wherein the copybook text file comprises a set of fields with corresponding values for each field, and converting the copybook structure into an internal data representation. The present invention also provides for accepting user input defining output options and accepting user input defining at least one interface function. The present invention generates an IDL file from the internal data representation which represents the copybook as an IDL struct, with each field of the copybook as a member of the struct, and which incorporates the interface function defined by the user. The generated IDL file enables communication with CORBA-compliant systems. The present invention also generates an application server class implementing the interface functions defined by the user. Finally, the present invention generates a copybook interface class, which is used by the client application through the application server class to set and to get the copybook values through the IDL file.

The currently preferred embodiment of the present invention communicates with the copybook text file at least in part through communication with an ASCII-based text messaging system. This alternative embodiment generates a copybook converter class which converts the value of a field of the copybook as represented in the IDL file into a character array which may be transmitted. The copybook converter class also does the reverse, converting a character array into the value of a field of the copybook as represented in the IDL file. In this alternative embodiment, the application server class additionally implements functions for communicating with the ASCII-based text messaging system, wherein the ASCII-based text messaging system enables communication with non-CORBA complaint systems.

The result of the above method is a software system and method for using the system to facilitate communication. The present invention may thus also be described as a software system for facilitating communication between a client application and server application having a copybook text file wherein the copybook text file comprises a set of fields with corresponding values for each field. The system includes an IDL file which represents the copybook as an IDL struct, with each field of the copybook as a member of the struct, and which incorporates at least one interface function defined by the user, wherein the IDL file enables communication with CORBA-compliant systems. The system includes an application server class implementing at least one interface function defined by the user. And the system includes a copybook interface class, which is used by the client application through the application server class to set and to get the copybook values through the IDL file. In the current preferred embodiment the system also includes an ASCII-based test messaging system, wherein the ASCII-based text messaging system enables communication with non-CORBA-compliant systems. The current preferred embodiment also includes a copybook converter class which converts the value of a field of the copybook as represented in the IDL file into a character array with may be transmitted and which converts a character array into the value of a field of the copybook as represented in the IDL file. In this current preferred embodiment the application server class also implements functions for communicating with the ASCII-based test messaging system.

A preferred embodiment of the present invention also provides a method for facilitating communication specifically including exchanging a request message and a response message between a client application and a server application having a copybook text file. This method works as follows. The client application is used to instantiate at least one Copybook Interface class object to build a request message. The Copybook Interface class object is used to marshall the request message as an IIOP message using an IDL Data Struct. The client application is used to instantiate an Application Server class object to handle the request message. The Application Server class object is used to receives the IIOP request message from the Copybook Interface class object and then to communicate the request message to the destination server application in a form compatible with the syntax and protocol of the server application copybook text file. The Application Server class object is then used to receive a response message from the destination server application and to return the response message in the form of an IIOP message. Finally, the Copybook Interface class object is used to receive the IIOP response message and to unmarshall the IIOP response message using the IDL Data Struct and return the response to the client application.

DESCRIPTION OF THE DRAWINGS

The invention, together with further advantages thereof, may best be understood by reference to the following description taken in conjunction with the accompanying drawings in which.

DETAILED DESCRIPTION

The present invention, sometimes referred to as an Application Message Wrapper Generation Wizard or Wizard (for short), is a tool to help application developers map Cobol or Natural copybooks into a message command for an ASCII-based text messaging service, preferably the Mercury applicationMessage command. In this sense, the Wizard facilitates communication between client applications and server applications by allowing the client to use generic requests and allowing the Wizard generated files providing the correct protocol and syntax or communication with the destination server application. In this matter, the Wizard automates the process of creating applicationMessage strings. The Wizard generates Java classes that will mine/plant data at runtime between business objects and a message string that corresponds to the copybook's data structure, and vice versa. The Wizard recognizes different data types of copybook fields respectively, and converts them to/from ASCII. The Java classes generated by the Wizard also serve to abstract mainframe services so as to encapsulate Mercury calls from the business layer by treating mainframe services as an ordinary operation on an object and so as to act as a layer that can serve to pave a path for migrating services away from a legacy environment. The generated Java code ensures efficient runtime performance for mining/planting of data. The Wizard helps reduce errors in offset calculations and drastically reduces development, debugging, maintenance, and training time, because client applications need only be programmed to send and receive messages using the codes generated by the Wizard rather than having to hand-map in each client application each of the copybooks which needs to be accessed.

Use of the Wizard to Generate Files

In its most preferred embodiment, the Wizard is running in a Windows NT 4.0 environment with Java Development Kit 1.6 or 1.7 installed. The Wizard is a GUI application intended to be user friendly. The Wizard follows several steps to generate the Java code which enables the described mapping and improvements. These steps in the context of the most preferred GUI-interface are described below.

The first step once the Wizard is started is to import the copybook which is desired to be mapped. Within the Wizard Application the user clicks on the "Import Copybook" button, and a file dialogue box is popped-up. The mouse is used to select the copybook. Once the desired copybook is selected by the user, the Import Copybook button is clicked again and the copybook is imported.

The next step is to configure the message options. To accomplish this, the user clicks on the "Send Message Option" page. In the preferred embodiment there are two sub-pages: "Basic Option" and "Advanced Options" page. These two pages are used for the configuration of the header to be used with the messages. In the preferred embodiment of the invention, a standardized header is used which has been standardized across the entire enterprise. While helpful, this level of header standardization is not necessary to gain the benefits of the present invention. Regardless, any header information which would be required or useful may be configured in this step by the user.

The next step is to build the business logic and generate the Java code. After successfully configuring the message options, the user clicks on the File Generation tab. The user inputs the Mainframe Application Name, this name is usually the server application name. The user clicks on the text field of Output File Directory, and a dialogue box will pop-up for the user to select an output file directory. A default package name, defined in the "Package Prefix" text field for the generated Java classes, can be used or it can be changed by typing a new prefix. An interface function can be defined by entering text in the Function Name field. "Request" and "Response" are two choice boxes for the selection of input parameter and return parameter respectively. The items in these two choice boxes are the name of imported copybook(s). After the interface function is defined, the user selects the TimeOut and Blocking options by clicking on "Add Function" button, so that the defined function will be added to the list box. This step is repeated until the desired functions have been added to the listbox. The user then selects whether to use a CORBA Binding or a persistent name service to communicate with Mercury. Finally, the user clicks on the Generate button, and a file dialogue window is popped-up. The Save button is used to save the generated files.

Figure 1:
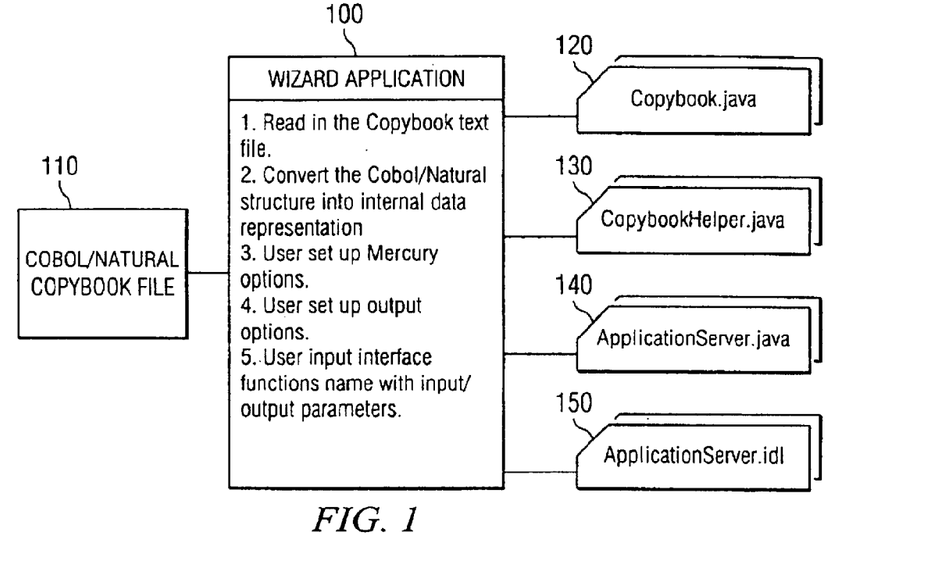
FIG. 1 is a diagrammatic representation of the functional use of the most preferred embodiment of the Wizard to create its Java codes and files.

FIG. 1 illustrates in a functional manner the activity of the Wizard application. The Wizard application 100 reads in the Cobol or Natural Copybook file 110. The Wizard application 100 converts the copybook structure into an internal data representation. This act can occur after the complete file is read into memory or storage or could occur piecemeal as the copybook structure is being read in. The Wizard application 100 provides for the user to set up (or input) options for use of an ASCII-based text messaging system, preferably the Mercury application. The Wizard application 100 provides for the user to set up output options. For example, these output options could include definition of interface functions, setting up the time out value, configuring the PNS server, selecting the output directory, and the like. The Wizard application 100 provides for the user to set up interface functions (and must include definition of at least one interface function), including providing the name and the input and output parameters for such functions (also referred to as business functions). The Wizard 100 accepts and processes these inputs and creates four files associated with the Copybook file 110: a Copybook Interface class 120 (referred to in this example as "Copybook.java" file), a Copybook Converter class 130 (referred to in this example as "CopybookHelper.java" file), an Application Server class 140 (referred to in this example as "ApplicationServer.java" file), and an IDL Data struct 150 (referred to in this example as "ApplicationServer.idl" file). Once the Wizard has generated these files, it is no longer needed for the mapping and conversions to take place. The files generated handle all of the work between the client application and the mainframe, ASCII-based text messaging service or ORB (Object Request Broker). Wizard only needs to be run again if new copybooks need to be imported or other changes have been made on the back end requiring a new set of generated files to handle such changes. The Wizard program itself does not need to be active or instantiated in the normal course of operations.

Files Generated by the Wizard

The four files being generated by the Wizard through this method may be generally referred to as: IDL Data struct; Copybook Interface class; Copybook Converter class; and Application Server class.

Copybook Interface class: This file is a class generated based on the copybook. Each field in the copybook is a private member variable in this class. There are two public methods (get and set) for each copybook field, the area used for setting and getting the value of the field. If the copybook contains block data defined as a nested structure (in COBOL and "OCCURS"), an inner class is defined inside the Copybook Interface class. The client application will use the Copybook Interface class to set/get the copybook values. This file is also referred to in specific examples as the "Copybook.java" file and the "LnpDataRecord1.java" file.

Copybook Converter class: This class is a supplement of the Copybook Interface class. This class converts the copybook's field value into a character array (applicationMessage), preferably an ASCII-text array with a defined structure. This class also does the reverse translation, converting a character array back into a copybook field value. This class is not exposed to the client application. This file is also referred to in specific examples as the "CopybookHelper.java" file and the "LnpDataRecord1Helper.java" file.

IDL Data struct: This IDL file is generated based on the copybook and the interface functions defined in the Wizard. The copybook is represented as an IDL struct, with each field as a member of the struct. The functions defined by the user are represented as interface functions. This file is also referred to in specific examples as the "ApplicationServer.idl" file and the "LNPDATA.idl" file.

Application Server class: This class is used by the client application. It includes the implementation of interface functions specified in the Wizard and functions that communicate with Mercury. Alternatively, it can be used as an implementation of the IDL Data struct. This file is also referred to in specific examples as the "ApplicationServer.java" file and the "LNPDATASrv.java" file.

Writing a Client Application to use the Files Generated by the Wizard

The client application sample code detailed below demonstrates how a client could be programmed to use the generated Java classes, set the values in the copybook, and get the values from a returned message.

The first part of this example instantiates the Copybook Interface class object. The second part starts to set each field value with set functions in the Copybook Interface class.

The third part instantiates the Application Server class object and makes calls to Mercury. The fourth part retrieves the results.

---

Sample client code:
public Hashtable getLocalNumberPortabilityData(String telephoneNumber) {

-continued

```
//First part
    //create instance of record and result
    LnpDataRecord record = new LnpDataRecord();
    LnpDataRecord result = new LnpDataRecord();
//End of First part
//Second part
    //set initial values in the copy book
    record.setLnpServingLecCd ("GK30");
    record.setLnpTelephoneNum(telephoneNumber);
    //convert the copybook to IDL format to send to the MainFrame
    ST_LnpDataRecord message = record.getIDL();
//End of Second part
//Third part
    try{
    //create an instance of the LNPDATA server to communicate with the
    MainFrame
        LNDDATASrv server = new LNDDATASrv();
    //send the request to the server with correctly populated copybook
        ST_LnpDataRecord serverResult = server.getLocalNumber
            (message);
    //convert the return result from IDL to the copybook
        result.setValueFromIDL(serverResult);
    }catch (MessageAttributeError e){
    }catch (MQSeriesError e){
    }catch (MainframeApplicationError e){
    }catch (TimedOut e){
    }catch (Exception e){
    }
//End of Third part
//Fourth part
    //get the values from the copybook to temp variables
    String portability = result.getLnpPortability();
    String owningLec = result.getLnpOwningLecCd();
    String servingLec = result.getLnpServingLecCd();
    //create and load the Hashtable
    Hashtable finalResult = new Hashtable();
    finalResult.put("Portability", portability);
    finalResult.put("OwningLec", owningLec);
    finalResult.put("ServingLec", servingLec);
    //return the Hashtable
    return finalResult;
}
//End of Fourth part
```

A client application may thus be modified to use the files created by the Wizard to send and receive messages. If the back-end/server systems are modified, while the Wizard would need to be run again to create a new set of enabling files, the client applications would not need to be significantly changed. In this manner, modifications would be made on a more limited basis whenever changes occurring on the back-end and/or as different copybooks or operating systems are integrated into the enterprise.

Figure 2:
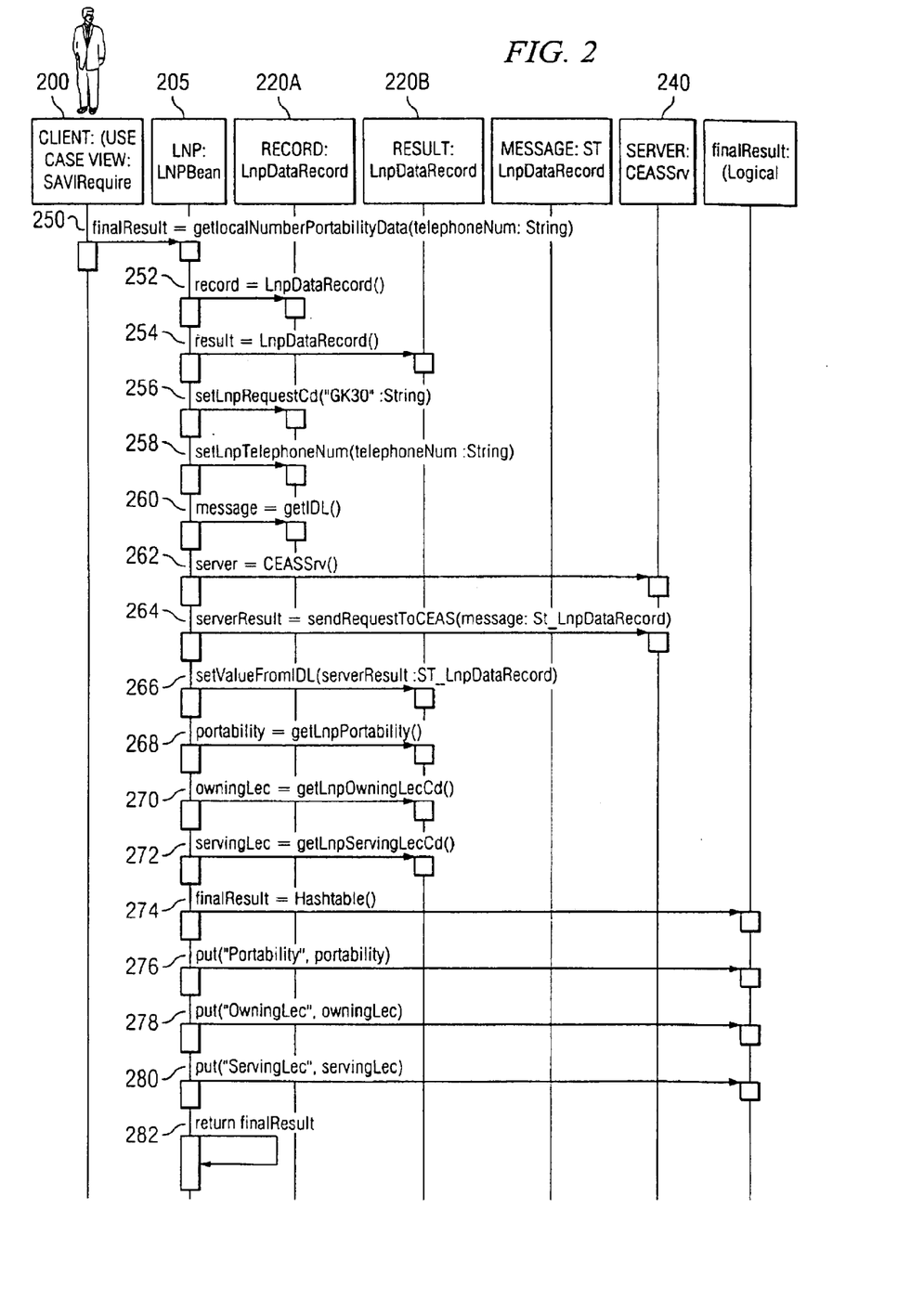
FIG. 2 is a sequence diagram which illustrates the steps associated with a client application using the Java codes and files created by the Wizard.

The sequence a client would actually go through using the sample code described above in place is illustrated in FIG. 2. FIG. 2 is a sequence diagram of a client application which has been constructed or modified to use the java codes generated by the Wizard with the addition of an enterprise java bean as an intermediary between the client application and the java codes.

In sequence step 250, the client application 200 calls a remote Enterprise Java Bean object function 205 named "getLocalNumberPortability". While this specific example uses an Enterprise Java Bean 205 as an intermediary for the client application 200, the client application itself can (and in the preferred embodiment does) directly access the files generated by the Wizard.

In sequence step 252, inside the remote bean 205, an LnpDataRecord (the Copybook Interface class 120 generated by Wizard) object is instantiated for sending data (the "record" or "request" record). This object is represented vertically by column "record: LnpDataRecord" 220A. In sequence step 254, inside the remote bean 205, an LnpDataRecord (the Copybook Interface class 120 generated by Wizard) object is instantiated for receiving data (the "result" or "response" record). This object is represented vertically by column "result:LnpDataRecord" 220B. These are two instances of objects instantiated from the same Copybook Interface class corresponding to Copybook Interface class 120. While represented separately, these are often the same object, which participates in sending the message out and then awaits the return message before terminating.

In sequence steps 256 & 258, the value of the sending object is set. In sequence step 260 the sending object is converted to IDL format (converted to an IIOP message). In sequence step 262, a CEASSrv (the Application Server class 140 generated by Wizard) object is instantiated as a local object 240. The CEASSrv object is part of a collection of objects represented by vertical column 240 for "server" objects independent of the bean 205. These objects would include an object instantiated from the Copybook Converter class 130, and the Mercury application. These objects or a combination of these objects could in fact be located on a remote server (or several remote servers) or could be co-located with the bean 205 on a local server or a partitioned area within the bean's server.

In sequence step 264, the remote bean 205 calls the user defined function in the Application Server class 240, and sends the data in IDL format. Inside the function, the data is converted into an ASCII message by an LnpDataRecord-Helper (the Copybook Converter class 130 generated by Wizard) object, and sent to the server application via Mercury. The server application receives the data and sends a reply back in ASCII format. The converter class then converts the ASCII back to the IDL format and sends back the data to the callee.

In sequence step 266, the value from IDL is set into the object defined in sequence step 254. In sequence steps 268, 270, & 272 the enterprise bean 205 gets the individual values. In sequence steps 274, 276, 278, & 280 the bean 205 processes the data received and returns it to the client application 200 in sequence step 282.

Flow-chart of Client Application using the Wizard Generated codes and Mercury

Figure 3:
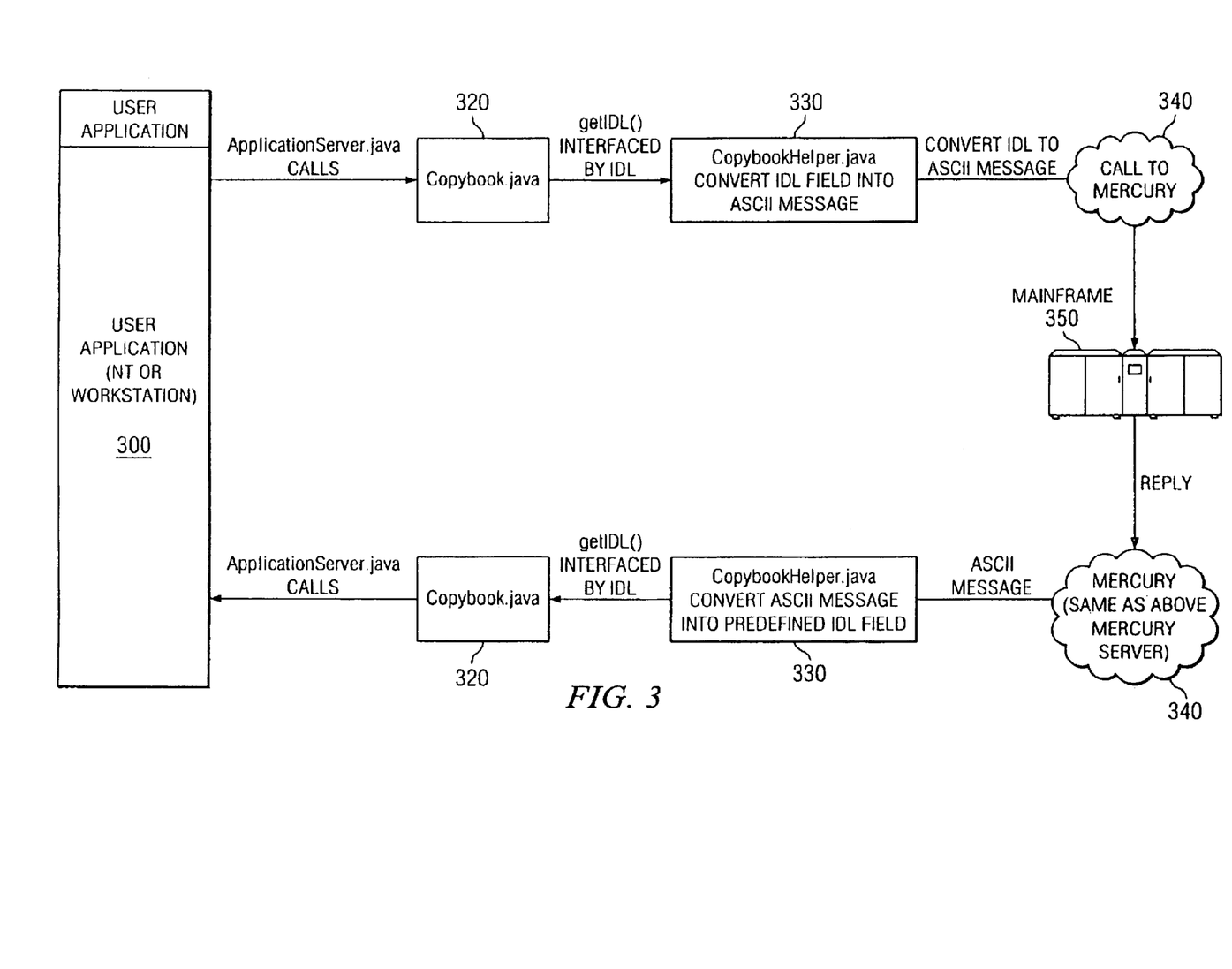
FIG. 3 is a diagrammatic flow diagram of messages moving back and forth between a client application and a mainframe using the files created by the Wizard.

Once the Wizard generated files are in place and the client applications have been modified to use Wizard generated files for messaging purposes, then the system as a whole behaves in a manner illustrated by the flow chart in FIG. 3.

The Client application 300 (also referred to as a User Application) calls one of the interface functions implemented by the Application Server class and instantiates an object from that class to accomplish the defined function. The client application instantiates a Copybook Interface class object 320 to set/get the desired copybook values. The Copybook Interface class object 320 works with the Application Server class object through the IDL Data struct to provide an IIOP message (also referred to here as a getIDL( ) call) to seek the desired information. This getIDL( ) call may be intercepted by a Copybook Converter object 330 which converts the request to a character array (preferably an ASCII-text character array) recognizable by an ASCII-based text messaging system 340, specifically the Mercury application in this instance. The Mercury application communicates with the desired server application on the mainframe 350 and more specifically with the copybook of the desired server application. This paragraph has outlined the steps to define and send the request message to the mainframe application.

Once the request is received at the mainframe 350, a response is returned along the same path only with the conversions going the opposite way. The Mercury application 340 receives and interprets the response from the mainframe application in the form of an ASCII-text character array and forwards the response back towards the client application. The response is intercepted by a Copybook Converter object 330 (preferably the same object 330 still existent waiting for the return message but could also be a different object instantiated from the same class as the earlier Copybook Converter object) and converted from a character array to a set of field values for the IDL struct. These are received and processed by the Copybook Interface object 320 (again preferably the same object 320 but could be a different object instantiated from the same class) with the Application Server class object through the IDL Data struct and returned to the client application 300 by the Application Server object.

Figure 4:
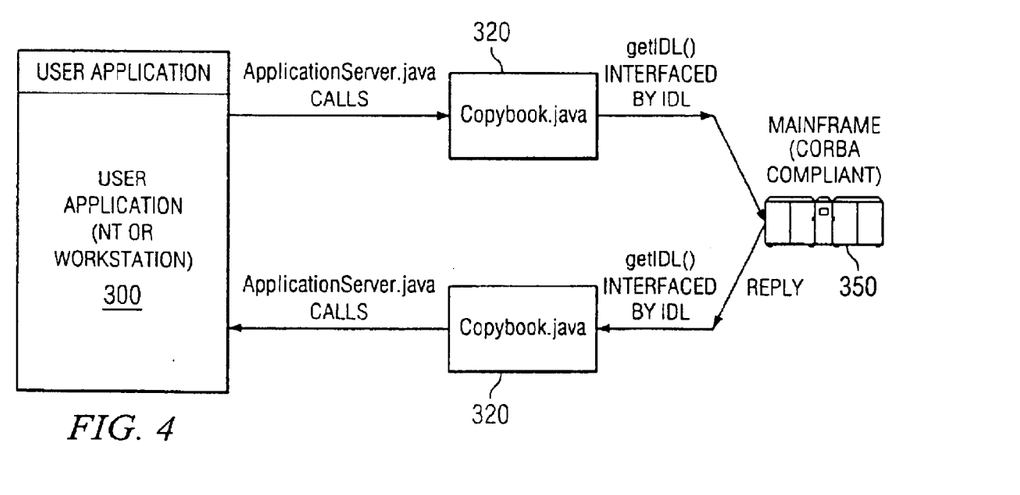
FIG. 4 is a diagrammatic flow diagram of messages moving back and forth between a client application and a Corba-compliant mainframe using the files created by the Wizard.

Flow-chart of Client Application using the Wizard Generated codes with a CORBA-compliant Mainframe FIG. 4 illustrates an alternative embodiment of the system where the mainframe is operating in a CORBA-compliant environment. In the embodiment illustrated in FIG. 4, the mainframe 350 and the resident software permits messaging through use of IDL's directly rather than requiring conversion for understanding by an ASCII-based text messaging system. In such an environment, the Copybook Converter object or objects 330 are unnecessary as is the Mercury application 340. The Copybook Converter object 330 could simply be turned off or removed and the getIDL( ) request would be picked up directly by the CORBA-compliant system and processed to the mainframe application from that point. The Client application 300 however, sees no difference between the two states, as it still simply make the same Application Server calls to get to the Copybook Interface object 320. By making this type of change transparent to the client application, the Wizard and the files it generates reduce the need to re-write client applications as the back-end systems are moved away from legacy systems to CORBA-compliant ORB's and the like.

In the embodiments discussed above, most of the elements up to but not including the Mercury application 340 reside on the client server with the client application 300. Mercury 340 resides on the server side. In an alternative embodiment, the Application Server object may reside on a separate server where it is accessible to the client application 300 by a bind rather than by a local call. The objects instantiated from the Copybook Interface class 320, IDL Data Struct, and Copybook Converter class 330 (if necessary) would most preferably still be local to the Client application 300 for best efficiency. In another variant as exemplified in FIG. 2, the Client application 300 described with respect to FIGS. 3 & 4 may represent an enterprise java bean accessed by primary client applications on other servers by a remote call to handle the message passing function, either alone or in combination with other functions. In such an instance, the enterprise java bean called for messaging would act as the client application with respect to the Wizard generated files as illustrated in FIGS. 3 & 4.

Preferred Description of Activity from Request Viewpoint

An alternative way to describe the functioning of the four wizard generated files in facilitating communication between the client application and the server application is to follow the activity surrounding the request/message initiated from the client application and the response/message returned from the server application. This description is of the most preferred embodiment of the present invention. The method preferably follows a path similar to the following described example:

The user inputs into the client application a request for information and one or some values associated with that request (for example the value being a person's name and the request seeking the person's phone number).

The client application instantiates an object from the Copybook Interface class to build (or generate) the message and provides the request and values to the Copybook Interface class object. The same Copybook Interface class object may be used to receive the return message, but preferable the client application instantiates a second Copybook Interface class object for that function.

The "build" Copybook Interface class object uses the IDL Data Struct to marshall an IIOP message (a form of CORBA-compliance message) based on the submitted values and request. In a sense, the IDL Data Struct is used as a template in this process. The Copybook Interface class object not only generates the IIOP message, but also insures that the values are provided in the proper form to correspond to the field-types defined in the destination copybook of the destination server application.

The client application instantiates an object from the Application Server class to handle the message. This may occur before, after, or effectively simultaneously with instantiation of the Copybook Interface class object.

The Application Server class object takes/receives the IIOP message generated by the Copybook Interface class object. The Application Server class object "knows" the location of the destination server application (and/or the location of a text messaging system (preferably ASCII-based) able to communicate with the destination server application) and whether the destination server application is resident in a CORBA environment or on a non-CORBA-compliant mainframe system.

If the destination server application is resident on a non-CORBA-compliant mainframe which may be communicated with through as ASCII-based text messaging system, then the Application Server class object uses an object instantiated from the Copybook Converter class to translate the IIOP message into an ASCII character array (at this point in this example a request) with the proper syntax, protocol, offset, etc. for the destination copybook.

The Application Server class object then sends the ASCII character array request to the ASCII-based test messaging system.

The ASCII-based test messaging system communicates with the server application and its copybook, providing the ASCII character array request to the server application and receives a response, again as an ASCII character array.

The ASCII-based text messaging system returns the ASCII character array response to the Application Server class object.

The Application Server class object takes/receives the ASCII character array response and uses an object instantiated from the Copybook Converter class to translate the ASCII character array to an IIOP message.

The Application Server class object sends the IIOP message to the client application through a Copybook Interface class object.

The "receive" Copybook Interface class object previously instantiated by the client application receives the IIOP message and uses the IDL Data Struct to unmarshall the message and return the desired response to the client application and hence to the user.

Alternatively:

If the destination server application is a CORBA-compliant application resident within a CORBA-compliant environment, then the Application Server class object preferably sends the IIOP message to the Object Request Broker (ORB) responsible for communicating with the destination server application (rather than going through a text-messaging system).

Effectively, the Application Server class object communicates with the server application and its copybook, through the ORB using the IIOP message and receives a new IIOP message as a response.

The Application Server class object sends the IIOP message to the client application through a Copybook Interface class object.

The "receive" Copybook Interface class object previously instantiated by the client application receives the IIOP message and uses the IDL Data Struct to unmarshall the message and return the desired response to the client application and hence to the user.

In a general sense:

The Application server class object takes/receives the IIOP message from the Copybook Interface class object and communicates with the destination server application to obtain a response message which the Application Server class object returns in the form of an IIOP message. The communication with the server application may be direct or may take place through or with the assistance of intermediary brokers or messaging systems. The communication with the server application may involve additional conversions or may occur entirely through IIOP messages exchanged between the Application Server class object and the server application equivalents.

The advantage again, is that all the client application needs to "know" (i.e. all it needs to be programmed to handle) is how to invoke/communicate with the Application Server class object and the Copybook Interface class object. Any changes in the destination server application, or its environment are transparent to the client application and require no coding changes within the client application. As an example, a client application may be written to use a Wizard generated set of files to communicate with a server application. Communication (exchange of information) occurs effectively, for example as described above for non-CORBA-compliant systems. The server application may be replaced by a CORBA-compliant version running in a CORBA-compliant environment but otherwise holding the same information needed by the client. The Wizard would be run to generate a new set of files, including a new IDL Data struct, a new Copybook Converter class (not needed in this particular example), a new Application Server class, and a new Copybook Interface class. The client application, with no rewriting of the code (and no recompiling, etc.) would then be able to communicate with the replacement server application using the newly generated wizard files, exactly (from its viewpoint) as it was able to communicate with the old server application using the previously generated wizard files. The change would be transparent to the client application. This would work whether the new server application was a different non-CORBA compliant application accessible through an ASCII-text messaging system or a CORBA-compliant application accessible through an ORB as described above. The only differences will be in the Wizard generated files, not in the client application.

A slightly different embodiment could have the Application Server class object instantiate the Copybook Interface class object and thereby require the client application merely call/bind/instantiate the Application Server class object and allow this object to manage the process from that point. The preferred method described immediately above has the client application instantiating the Copybook Interface class object itself to build/generate the IIOP message and also has the client application calling or binding or instantiating the Application Server class object to manage the handling of the IIOP message and response. This local control of the Copybook Interface class object by the client application is particular preferable from an efficiency standpoint in the event (discussed as a possibility above) that the Application Server object is resident on a different server than the client application.

In summary, the COBOL/Natural Copybook to Java Conversion Wizard of the present invention converts COBOL/Natural Copybooks into Java Classes and provides an easy way to set/get the value of each field. The generated classes interface with Mainframe applications through an ASCII-based text messaging system such as the Mercury application. As a generic conversion tool, the application can convert any standard Cobol/Natural Copybook to Java Classes and interface with Mainframe applications through Mercury. In the future, when Mainframe CORBA is available, the generated framework can communicate directly with Mainframe applications.

By use of the present invention, Client applications do not need to build a mainframe message by hand, thereby increasing productivity and dramatically reducing error rates. Since Cobol and Natural copybooks are only "converted" once, there is reduced chance of mishandling of the offsets for the specific copybook in question by one of the large number of applications which would otherwise have to be programmed to address the copybook. In this manner, the present invention precisely converts each Cobol/Natural data type into Java data types. The present invention provides a seamless migration path for the future integration with a mainframe based Object Request Broker (ORB). It provides an Object-Oriented Java representation of COBOL or Natural programs, promoting an object model view of the enterprise. And it provides application developers an easy way to build Mercury Architecture compliant messages by supplying individual set/get methods for each field COBOL/Natural structure.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method for generating computer files based on user input which facilitate communication between a client application and a server application having copybook text file wherein the copybook text file comprises a copybook structure, the method comprising:

(a) reading in a copybook text file selected by the user, wherein the copybook text file comprises a set of fields with corresponding values for each field;

(b) converting the copybook structure into an internal data representation;

(c) accepting user input defining at least one interface function;

(d) generating an IDL file from the internal data representation which represents the copybook as an IDL struct, with each field of the copybook as a member of the struct, and which incorporates the interface function defined by the user, wherein the IDL file enables communication with CORBA-compliant systems;

(e) generating an application server class implementing the interface function defined by the user; and (f) generating a copybook interface class, which is used by the client application through the application server class to set and to get the copybook values through the IDL file.

2. The method of claim 1 wherein communicating with the server application having a copybook text file further comprises communication with an ASCII-based text messaging system, the method further comprising:

generating a copybook converter class which converts the value of a field of the copybook as represented in the IDL file into a character array which may be transmitted and which converts a character array into the value of a field of the copybook as represented in the IDL file; and wherein the application server class also implements functions for communicating with the ASCII-based text messaging system, wherein the ASCII-based text messaging system enables communication with server applications resident on non-CORBA-compliant systems.

3. The method of claim 1 wherein the copybook text file comprises a COBOL copybook text file.

4. The method of claim 1 wherein the copybook text file comprises a Natural pda file.

5. The method of claim 1 wherein the copybook text file comprises a Natural pdl file.

6. The method of claim 2 wherein the copybook text file comprises a COBOL copybook test file.

7. The method of claim 2 wherein the copybook text file comprises a Natural pda file.

8. The method of claim 2 wherein the copybook text file comprises a Natural pdl file.

9. A software system for facilitating communication between a client application and server application having a copybook text file wherein the copybook text file comprises a set of fields with corresponding values for each field, the system comprising:

(a) an IDL file which represents the copybook as an IDL struct, with each field of the copybook as a member of the struct, and which incorporates at least one interface function defined by the user, wherein the IDL file enables communication with CORBA-compliant systems;

(b) an application server class implementing at least one interface function defined by the user;

(c) a copybook interface class, which is used by the client application through the application server class to set and to get the copybook values through the IDL file.

10. The software system of claim 9 wherein communicating with the server application having a copybook text file further comprises communication with an ASCII-based text messaging system, the system further comprising:

(d) an ASCII-based text messaging system, wherein the ASCII-based text messaging system enables communication with non-CORBA-compliant systems (e) a copybook converter class which converts the value of a field of the copybook as represented in the IDL file into a character array which may be transmitted and which converts a character array into the value of a field of the copybook as represented in the IDL file; and (b1) wherein the application server class also implements functions for communicating with the ASCII-based text messaging system.

11. A method for facilitating communication specifically including exchanging a request message and a response message between a client application and a server application having a copybook text file, the method comprising:

(a) using the client application to instantiate at least one Copybook Interface class object to build a request message;

(b) using the Copybook Interface class object to marshall the request message as an IIOP message using an IDL Data Struct;

(c) using the client application to instantiate an Application Server class object to handle the request message;

(d) using the Application Server class object to receive the IIOP request message from the Copybook Interface class object;

(e) using the Application Server class object to communicate the request message to the destination server application in a form compatible with the syntax and protocol of the server application copybook text file;

(f) using the Application Server class object to receive a response message from the destination server application;

(g) using the Application Server class object to return the response message in the form of an IIOP message;

(h) using the Copybook Interface class object to receive the IIOP response message;

(i) using the Copybook Interface class object to unmarshall the IIOP response message using the IDL Data Struct and to return the response to the client application.

12. The method of claim 11, wherein the server application is working with a CORBA-compliant Object Request Broker.

(e1) wherein the act of using the Application Server class object to communicate the request message to the destination server application in a form compatible with the syntax and protocol of the server application copybook text file comprises using the application server class object to send the IIOP request message to an Object Request Broker responsible for communicating with the server application; and, (f1) wherein the act of using the Application Server class object to receive a response message from the server application comprises receiving an IIOP response message from the server application, through the Object Request Broker.

13. The method of claim 11 wherein the server application is resident on a non-CORBA complaint system and is working with an ASCII-based text messaging system, wherein the act of using the Application Server class object to communicate the request message to the server application in a form compatible with the syntax and protocol of the server application copybook text file comprises:

(e1) using the Application Server class object to convert the IIOP request message using a Copybook Converter object into a character array recognizable by the ASCII-based text messaging system and compatible with the syntax and protocol of the server application copybook text file;

(e2) using the Application Server class object to communicate the request character array to the ASCII-based text messaging system;

(e3) using the ASCII based text messaging system to communicate with the copybook text file of the server application based on the character array;

(e4) using the ASCII-based text messaging system to receive and interpret a response message from the copybook text file of the server application; and wherein the act of using the Application Server class object to receive a response message from the server application comprises:

(f1) using the ASCII-based test messaging system to return a response message in the form of an ASCII-text character array to the Application Server class object; and wherein the act of using the Application Server class object to return the response message in the form of an IIOP message comprises;

(g1) using the Application Server class object to convert the response character array into an IIOP message using the Copybook Converter object;

(g2) using the Application Server class object to return the IIOP response message.

14. The method of claim 11, wherein the act of using the client application to instantiate at least one Copybook Interface class object to build a message comprises using the client application to instantiate a first Copybook Interface class object to build a message and a second Copybook Interface class object to receive the response message;

wherein the Copybook Interface class object used to marshall the request message as an IIOP message using an IDL Data Struct comprises the first Copybook Interface class object; and wherein the Copybook Interface class object used to receive the IIOP response message and used to unmarshall the IIOP response message using the IDL Data Struct and to return the desired response to the client application comprises the second Copybook Interface class object.

15. The method of claim 11 wherein the copybook text file comprises a COBOL copybook text file.

16. The method of claim 11 wherein the copybook text file comprises a Natural pda file.

17. The method of claim 11 wherein the copybook text file comprises a Natural pdl file.

18. The method of claim 9 wherein the copybook text file comprises a COBOL copybook test file.

19. The method of claim 9 wherein the copybook text file comprises a Natural pda file.

20. The method of claim 9 wherein the copybook text file comprises a Natural pdl file.

* * * * *